May 1, 1934.    J. C. DIEHL    1,956,825
COMPUTING MECHANISM
Filed Jan. 3, 1931
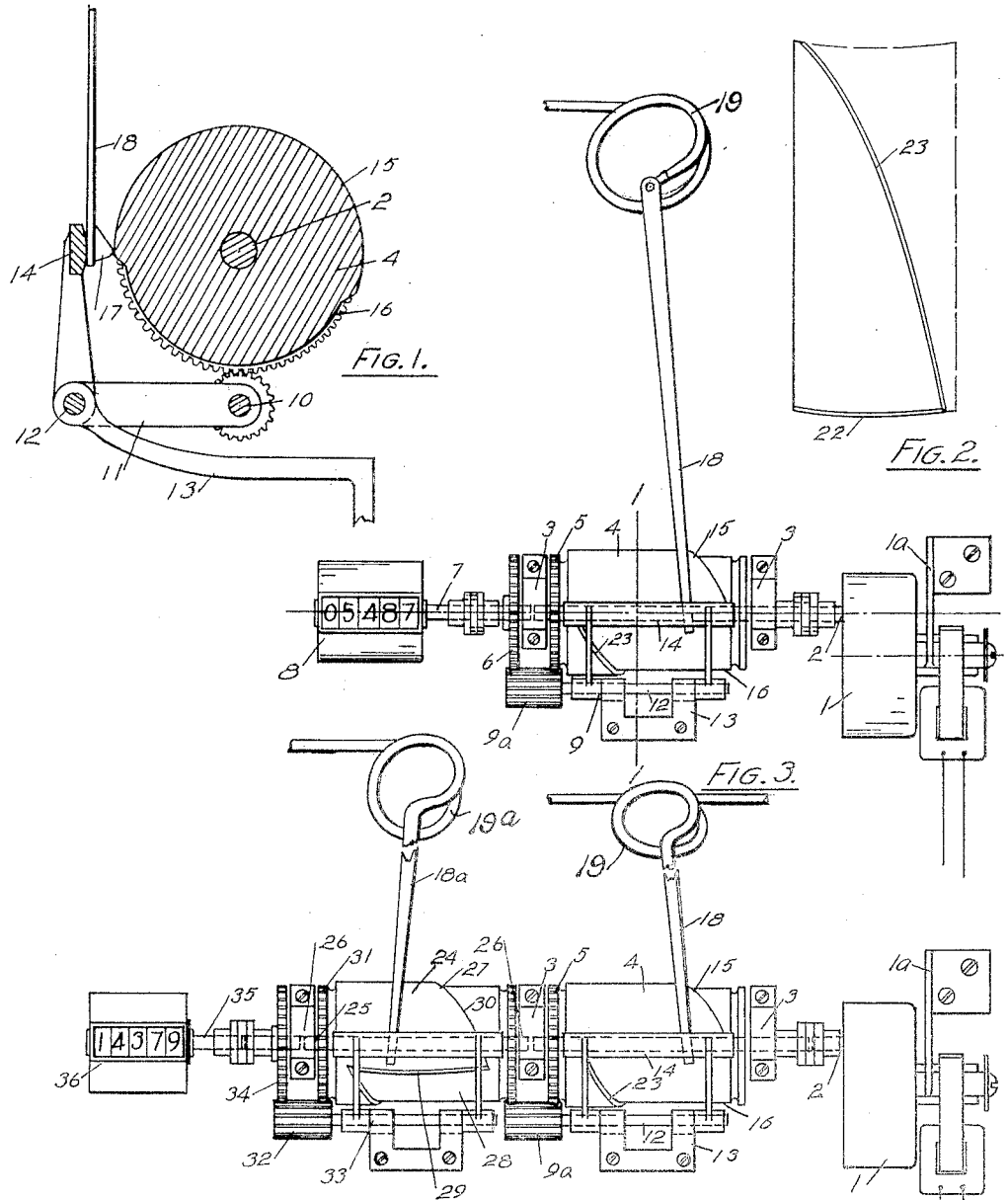
John C. Diehl
INVENTOR.
BY
ATTORNEYS.

Patented May 1, 1934

1,956,825

UNITED STATES PATENT OFFICE 1,956,825

COMPUTING MECHANISM

John C. Diehl, Erie, Pa., assignor to American Meter Company, New York, N. Y., a corporation of Delaware Application January 3, 1931, Serial No. 506,398

6 Claims. (Cl. 235—61)

This computing device is designed to compute various items, one at least of which is variable. This may be arranged to multiply, which is the more common use of the device, divide, add, or subtract. As exemplified the device is shown as arranged for computing the flow through an orifice meter, although it may be used in computing one variable condition. Devices of this kind have been attempted heretofore, but in the present invention the devices responsive to variations in conditions, in the present instance, the pressures directly set the mechanism so that the computing devices not only control the computation, but also assist in actuating the parts in bringing about this result. This adds very greatly to the simplicity of the device without in any way detracting from its accuracy. Features and details of the invention will appear from the specification and claims.

A preferred embodiment of the invention is illustrated in the accompanying drawing as follows:—

Fig. 1 shows a section on the line 1—1 in Fig. 3.

Fig. 2 a development of one of the computing cylinders.

Fig. 3 an elevation of the apparatus operating with a single variable.

Fig. 4 a similar apparatus designed to carry the application on to a plurality of variables.

1 marks a clock mechanism, preferably electrically actuated. This is mounted on a bracket 1a. The clock drives a shaft 2, this shaft being carried in bearings 3—3. A cylinder 4 is mounted on the shaft and driven by it. A gear 5 is arranged at one end of the cylinder 4 and moves with it. A similar gear 6 is mounted on a shaft 7, the shaft 7 being concentric with the shaft 2. The shaft 7 extends to a register 8. A connecting device 9 carries a gear 9a which is adapted to be thrown into mesh with the gears 5 and 6 and put them in driving relation. The gear 9a is mounted on a shaft 10 carried by a rock frame 11. The rock frame is pivoted on a rod 12, the rod 12 being carried by a bracket 13. An actuating bar 14 is carried by the frame along the face of the cylinder 4.

The cylinder has a raised profile 15 and a depressed portion 16. A rider 17 is adapted to follow the surface of the cylinder. This rider is arranged on the end of an arm 18 extending from a differential U gauge (not shown). The profile or raised portion on the cylinder 4 has a lifting edge 22 and a releasing edge 23. This is clearly indicated in the development of the surface of the cylinder shown in Fig. 2. As shown in Fig. 3, the rider 17 is moved along the cylinder 4 between the actuating bar and the cylinder and when the rider is on the profile between the lifting edge 22 and the releasing edge 23 the actuating bar is thrown outwardly from the cylinder, thus rocking the rocking frame 11 and therewith the gear 9a into mesh with the gears 5 and 6. Consequently there is a forward movement of the gear 6 corresponding to the circumferential amplitude of the profile, or raised portion 15 on the cylinder at the position occupied by the rider 17. As the pressure increases, or decreases, the rider is moved along the cylinder axially and consequently with each revolution of the cylinder a greater, or less, travel is given to the gear 6 and consequently to the register 8. As shown the releasing edge 23 is so shaped as to make a computation of the square root of the pressure to which the spring 19 responds and the counter will indicate computations of time as indicated by the rotations controlled by the clock times the square root of the pressure to which the spring 19 is subjected. As an example, let us assume the pressure arm 18 indicates 25 pounds pressure and that the cylinder 4 revolves once an hour and that the maximum pressure reading obtainable is 100 pounds. The cylinder 4 with the profile, or raised portion revolving in a counter-clockwise direction engages the rider with each revolution at the entering, or lifting edge 22. This lifting of the rider immediately puts the gear 9a in mesh and whatever the amplitude of the raised portion, or profile portion may be is communicated to the counter 8. In the present instance the cam is made in accordance with the square root of the pressure as indicated by the pressure arm 18. Then the gear 5 will revolve a part of a revolution with this pressure setting of the arm 18 proportionate to the $$\sqrt{25}$$

or $\tfrac{5}{10}$ of a revolution, assuming that the wheel is divided into ten units and the unit wheel of the register is revolved the same amount, thus adding 5 to the mount. This is the proper amount to add since in this example the cylinder 4 makes one revolution each hour. In reality the cylinder is usually so formed as to rotate much faster than this, but this indicates the theory. On the other hand, if the pressure on the spring 19 is 49 pounds, the arm will swing in response to this so that the profile has an amplitude at the place assumed by the rider equivalent to the $$\sqrt{49}$$

or $\tfrac{7}{10}$ of a revolution and the unit wheel of the register 8 revolving the same amount adds 7 to the reading.

In Fig. 4 an additional cylinder is used in tandem so that the different variables may be multiplied or divided. As exemplified, the pressure arm 18a may be connected to a pressure spring 19a subjected to the direct pressure of a line having an orifice meter and it is desired in the computation to multiply the square root of this pressure by the square root of the differential pressure as indicated in the initial cylinder by the elapsed time. The cylinder 24 has a shaft 25 and is mounted in bearings 26, the shaft 25 being concentric with the shaft 2. The cylinder has a profile, or raised portion 27, a depressed portion 28, a lifting edge 29, and a releasing edge 30, the releasing edge having a contour which will vary as the square root. A gear 31 is fixed on the cylinder 24 and meshes with a connecting gear 32. The connecting gear is carried by a connecting actuating mechanism 33 corresponding to the mechanism shown in Fig. 3 and operates in exactly the same manner and the arm 18a is provided with a rider 17a operating exactly as the rider in the initial cylinder. The connecting gear meshes with a gear 34 fixed on a shaft 35 concentric with the shafts 25 and 2 and extends to a counter 36. In this apparatus the cylinder 24 is advanced in accordance with the setting of the setting of the rider 17 on the initial cylinder 4 and through the connecting gear 9a transmits a movement corresponding to a multiple of the raised profile at the point of adjustment of the rider so that the cylinder 24 is advanced in response to the position of the rider on the initial cylinder. The cylinder 24 operating in exactly the same way communicates its movement to the gear 34 through the connecting mechanism, the movement being exactly responsive to the multiple of the profile, or raised portion, at the position occupied by the rider. As a result, the register indicates the multiple of the square root as determined by the position of the riders on the two cylinders. As an example, if we have a differential pressure of 81 pounds and a static pressure of 49 pounds and the clock movement is so constructed as to revolve the cylinder ten times an hour, then for each revolution of the cylinder 4 the rider is on the lifted portion of the profile and thus actuates the connecting mechanism at a point having an amplitude to revolve a part of a revolution proportioned to the $$\sqrt{81}$$

or $\frac{9}{10}$ of a revolution for each revolution of the cylinder and in ten revolutions would revolve $\frac{9}{10} \times 10$, or 9 revolutions in each hour.

The cylinder 24, therefore, in turn through its raised portion operates its connecting gear 32 through $$\sqrt{49}$$

or $\frac{7}{10}$ of each revolution and in an hour's time would deliver to the gear 34 $9 \times \frac{7}{10}$ or $6\frac{3}{10}$ revolutions. Thus the unit wheel of the counter or register 36 is revolved $6\frac{3}{10}$ revolutions each hour under the above conditions and the count of 63 is added for each hour's run $$(1\sqrt{81 \times 49} = 63).$$

If there is an increase, or a decrease in either the differential, or the direct pressure, there is a corresponding shifting of the riders and a corresponding response on the counter, or index.

What I claim as new is—

1. In a computing mechanism, the combination of a rotary actuator; an actuating profile on the actuator varying axially in circumferential amplitude in accordance with the computation desired; a register; a gear connected with the actuator; a gear connected with the register; a connecting gearing between said gears establishing a connection to the register; devices actuated by the profile of the actuator engaging and disengaging the gearing in accordance with the amplitude of the profile; and means responsive to values to be computed varying the setting of the devices axially along the actuator to bring that part of the profile having a computing amplitude corresponding to the values into action with said devices.

2. In a computing mechanism, the combination of a rotary actuator; an actuating profile on the actuator varying axially in circumferential amplitude in accordance with the computation desired; a register; a gear connected with the actuator; a gear connected with the register; a connecting gear between said gears establishing a connection to the register; devices actuated by the profile of the actuator engaging and disengaging the connecting gear in accordance with the amplitude of the profile and means responsive to values to be computed varying the setting of the devices axially along the actuator to bring that part of the profile having a computing amplitude corresponding to the values into action with said devices.

3. In a computing mechanism, the combination of a rotary actuator; an actuating profile on the actuator varying axially in circumferential amplitude in accordance with the computation desired; a register; a gear connected with the actuator; a gear connected with the register; a connecting gear between said gears establishing a connection to the register; a frame carrying said gear actuated by the profile of the actuator engaging and disengaging the gear in accordance with the amplitude of the profile; and means responsive to values to be computed varying the setting of the devices axially along the actuator to bring that part of the profile having a computing amplitude corresponding to the values into action with said devices.

4. In a computing mechanism, the combination of a rotary actuator; an actuating profile on the actuator varying axially in circumferential amplitude in accordance with the computation desired; a register; a gear connected with the actuator; a gear connected with the register; a connecting gear between said gears establishing a connection to the register; a rocking frame carrying said gear actuated by the profile of the actuator engaging and disengaging the gear in accordance with the amplitude of the profile; and means responsive to values to be computed varying the setting of the devices axially along the actuator to bring that part of the profile having a computing amplitude corresponding to the values into action with said devices.

5. In a computing mechanism, the combination of a rotary actuator; an actuating profile on the actuator varying axially in circumferential amplitude in accordance with the computation desired; a register; a gear connected with the actuator; a gear connected with the register; a connection leading to the register; a frame having an actuating bar across the actuator; a rider between the bar and the actuator, said rider operating the bar to actuate the frame and engage and disengage the connection in accordance with the profile; and means responsive to a value to be computed varying the setting of the rider axially along the actuator to bring that part of the profile having a computing amplitude corresponding to the value into action with said rider.

6. In a computing mechanism, the combination of a rotary actuator; an actuating profile on the actuator varying axially in circumferential amplitude in accordance with the computation desired; a register; a gear connected with the actuator; a gear connected with the register; a frame having an actuating bar across the actuator, said frame extending from the actuator in a tangential direction; a rider between the bar and actuator, said rider operating the bar to actuate the frame and engage and disengage the connection in accordance with the profile; and means extending in the opposite direction from the frame and responsive to a value to be computed varying the setting of the rider axially along the actuator to bring that part of the profile having a computing amplitude corresponding to the value into action with said rider.

JOHN C. DIEHL.